US007503065B1

(12) United States Patent
Packingham et al.

(10) Patent No.: US 7,503,065 B1
(45) Date of Patent: Mar. 10, 2009

(54) METHOD AND SYSTEM FOR GATEWAY-BASED AUTHENTICATION

(75) Inventors: Kevin Packingham, Overland Park, KS (US); Robert Urbanek, Belton, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 970 days.

(21) Appl. No.: 10/128,828

(22) Filed: Apr. 24, 2002

(51) Int. Cl.
*H04L 9/32* (2006.01)
*H04L 9/00* (2006.01)

(52) U.S. Cl. .................. 726/12; 726/4; 726/8; 726/27; 713/153; 713/182

(58) Field of Classification Search ............ 726/4, 726/8, 12
See application file for complete search history.

(56) References Cited

U.S. PATENT DOCUMENTS

| 5,077,790 A | 12/1991 | D'Amico et al. |
| 6,092,196 A | 7/2000 | Reiche |
| 6,161,185 A | 12/2000 | Guthrie et al. |
| 6,178,511 B1 | 1/2001 | Cohen et al. |
| 6,823,373 B1 * | 11/2004 | Pancha et al. ............... 709/219 |
| 6,892,307 B1 * | 5/2005 | Wood et al. ................... 726/8 |
| 6,961,776 B1 * | 11/2005 | Buckingham et al. ....... 709/229 |
| 7,263,717 B1 * | 8/2007 | Boydstun et al. ............... 726/4 |
| 7,305,550 B2 * | 12/2007 | Oliver et al. ................ 713/156 |
| 2003/0028763 A1 * | 2/2003 | Malinen et al. ............. 713/155 |
| 2003/0103607 A1 * | 6/2003 | Feakes .................... 379/88.17 |

OTHER PUBLICATIONS

Chen, ZDNet: Tech Update: Enterprise Applications/Single sign-on battle looms, http://techupdate.zdnet.com/techupdate/stories/main/0,14179,2824248,00.html, 2 pages, Nov. 26, 2001.
Introduction to Single Sign-On, http://www.opengroup.org/security/sso/sso_intro.htm, 3 pages, Feb. 19, 2002.
Novell: Novell Securelogin: Quick Look, hhtp://www.novell.com/source/printer_friendly/q120017_en.html, 1 page, N/A.

* cited by examiner

*Primary Examiner*—Kaveh Abrishamkar

(57) ABSTRACT

A method and system permits efficient user authentication based on a gateway rather than information or hardware of a user's communication device. The system may include a gateway that is operated by a trusted entity, the gateway logically connected between a communication network, such as the Internet, and the user's device. The gateway can authenticate a user using device-specific as well as user-specific identifiers, and the authentication can then be passed on to multiple applications that are accessible via the network.

22 Claims, 3 Drawing Sheets

METHOD AND SYSTEM FOR GATEWAY-BASED AUTHENTICATION

BACKGROUND

1. Field of the Invention

The present invention relates to communications and, more particularly, to authenticating devices, users, and/or interactions.

2. General Background

Many people are increasingly relying on Internet resources to obtain information, and various wireless communication devices, such as wireless telephones and wireless PDAs, are now capable of accessing the Internet. Also, non-wireless devices such as digital cameras, internet appliances can access the Internet. In general, wireless devices can serve as wireless client devices in sessions with external servers. A gateway may be used as an access point through which a subscriber can access one or more server applications. Such a gateway can act as either an application provider or as a conduit between a subscriber and a more remote application provider.

Typically, when a gateway provides access to an application, it can automatically determine the subscriber's device ID (as conveyed in session setup signals) and then provide the device ID to the application. The application could then customize a service for that device, based on the device ID. (Further, the gateway could provide the application with other information as well, to facilitate additional customization of services. Examples of such other information include a "source code" that indicates the service provider who "owns" (serves) the subscriber, and a domain (e.g., access network or type of gateway, such as wireless web, voice command, etc.) from which the subscriber is contacting the application).

For example, a voice command platform could pass a calling subscriber's device ID to a voice-activated dialing (VAD) application. The VAD application could then use that device ID as a "key" or identifier to access a personal address book associated with the calling subscriber. The VAD application could then receive a name spoken by the calling subscriber and, by reference to the personal address book, convert the name to an associated telephone number. The VAD application could then set up a call to that telephone number.

For applications that are provided externally, such as on a third-party service provider's server, a user may be required to log on to the application in order to access information, especially protected information that is associated with individual users, such as account information at financial institutions, or credit card and other personal information maintained by businesses the user patronizes.

It may be inconvenient for a user to log on separately to multiple applications or even a single application, especially if the user is conducting a session from a wireless device and using a voice browser or another method to navigate that is harder than using a full-size PC to type web addresses or activate hyperlinks. Thus, a better method of authenticating users is desired.

SUMMARY

In a first principal aspect, an exemplary embodiment provides a gateway that includes a user communication interface and a processor. The gateway can include a set of instructions that the processor can execute to receive, via the communication interface, at least a device identifier, the device identifier being associated with a user device. The processor can also include a set of instructions that the processor can execute to set an authentication flag in response to the device identifier being received, and to pass an authentication indicator to at least one application when the authentication flag is set.

The gateway can also include a set of instructions that the processor can execute to pass to the application a static unique identifier associated with the user device.

In a second principal aspect, the exemplary embodiment provides a gateway that includes a user communication interface and a processor. The gateway can include a set of instructions that the processor can execute to receive, via the communication interface, at least a device identifier, the device identifier being associated with a user device.

The gateway can also include a set of instructions that the processor can execute to receive a gateway password via the communication interface. The gateway password can be associated with an individual user, and the processor can also set an authentication flag in response to the device identifier and the gateway password being received.

The gateway can also include a set of instructions that the processor can execute to pass, via the network interface, an authentication indicator and a static, unique identifier associated with the individual user, to at least one application when the authentication flag is set. In response to passing the static, unique identifier and the authentication indicator, the gateway can receive, via the network interface, application information from the at least one application. The information received may be information that is normally available only after a user enters a password that is associated with the user and with the application, that is, a password other than the gateway password, such as the password the user would use when logging on to the application from a PC to access a personal financial account, for example. The application information can be transmitted to the user via the communication interface.

In a third principal aspect, an exemplary embodiment of the present invention provides a method for authenticating a user of a communication device. The method can include the following steps: 1) receiving at least a device identifier that is associated with the communication device; 2) receiving a user ID that is associated with the user; 3) setting an authentication flag in response to receiving the device identifier and the user ID; 4) passing an authentication indicator that is associated with the user ID and with the communication device to at least one application in response to the authentication flag being set; and 5) passing to the application a static unique identifier that is associated with the user ID and the communication device in response to the authentication flag being set.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

In wireless devices and other devices that are capable of displaying content from remote servers, such as Internet Web pages, it is convenient to allow users to provide authentication one time and then be allowed access to multiple resources without re-authenticating or re-identifying themselves as authorized users. Such a "single log-on" may be especially helpful, for example, if the user is accessing resources via a voice-command platform, because it can be difficult to enter passwords and user IDs via voice command. Further, because wireless service providers are "trusted" entities, with good control over access to their resources, third-party service providers or entities may be willing to recognize any authentication or user verification passed from a wireless service provider to the third-party provider or entity.

More specifically, a wireless service provider can authenticate a user of its system and pass an indication of the authentication on to a third-party service provider, such as a financial institution. Once the authentication is received by the third party, the third-party provider may trust the authentication and provide access to information (such as user account information or other sensitive information) that is normally only supplied to users who provide authentication (e.g., passwords and/or user IDs) directly to the third party. Thus, after performing a single log-on, a user may access, via a wireless device or other communication device, any information to which he/she is entitled. Moreover, once the user is authenticated, he or she may be allowed access to multiple third-party providers while in a single communication session (that is, while a device's browser application is active and the user is on-line), even though the user may have different account numbers, user IDs, and/or passwords with the providers whose applications are accessed.

Figure 1:
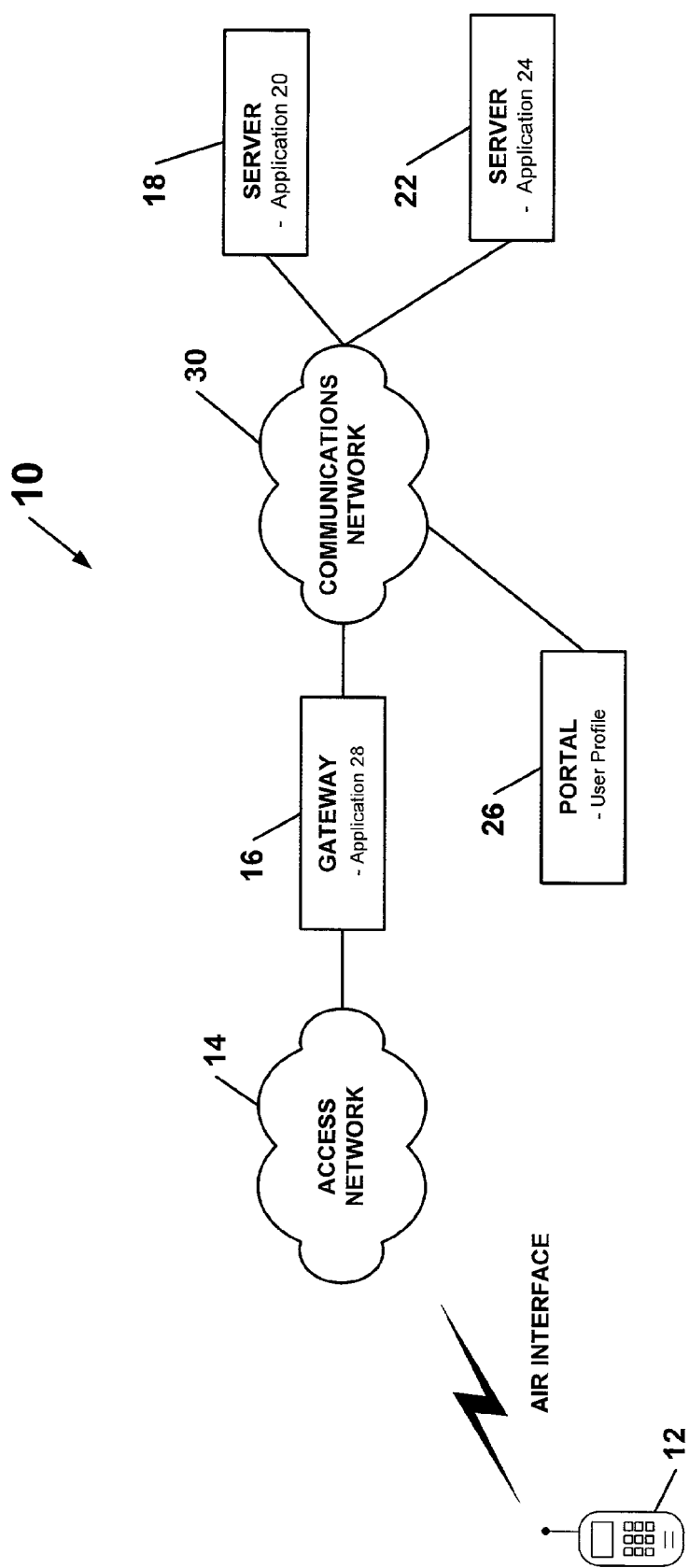
FIG. 1 is a simplified diagram that illustrates a system in which the exemplary embodiments can be employed.

Referring now to the drawings, FIG. 1 illustrates a system 10 in which the exemplary embodiments can be employed. In system 10, a user device 12 can access various services via access network 14 and gateway 16, which provides an interface between user device 12 and servers such as application server 18 and application server 22, which in turn control access to application 20 and application 24, respectively.

User device 12 may be a mobile station, a wireless PDA, or other suitable user communication device, including, without limitation, a wireline (i.e., conventional) telephone, personal computer, modem, digital camera, or internet appliance. Gateway 16 can be a voice-command platform or a data service node, for example. In addition to applications 20 and 24, gateway 16 can provide access to application 28 which may be located at gateway 16, rather than at a remote server.

If gateway 16 is a voice command platform, it can provide an interface between a user's speech communications and an application. For instance, a voice command platform may include an analog-to-digital converter for converting an incoming analog speech signal from a user into a digitized speech signal. Alternatively, the user's speech signal might already be digitized, as in a voice-over-IP communication system, in which case analog-to-digital conversion would be unnecessary. On the outgoing side, the voice command platform may include a text-to-speech engine or functionality for converting text (e.g., text comprising application information) into outgoing speech signals, which may or may not be converted to analog signals (i.e., by a digital-to-analog converter) at the voice command platform. Such analog speech signals can then be transmitted to the user via a user communication device.

If the voice command platform includes a VXML browser or "interpreter", it can also load VXML documents (akin to web pages) from third party web servers or from internal storage and execute logic defined by those documents. To execute VXML logic, the VXML interpreter interprets tags set forth in the application and causes a processor to execute logic defined by the tags. In such an arrangement, the voice command platform could be called a voice web gateway.

Gateway 16 may access a portal, such as portal 26, or any other resource to retrieve records of user and account information associated with user devices—e.g., a user profile. A user profile can include records associated with particular user devices as well as accounts associated with user devices and/or particular users. The records can include passwords and user ID information, data regarding external applications associated with users, user preference information, and user session information, as well as other data. This information can be maintained in a relational database or in any other manner desired (whether as one module or separate objects, such as a meta-directory) and it can be co-located with gateway 16 or elsewhere, such as portal 26.

Figure 2:
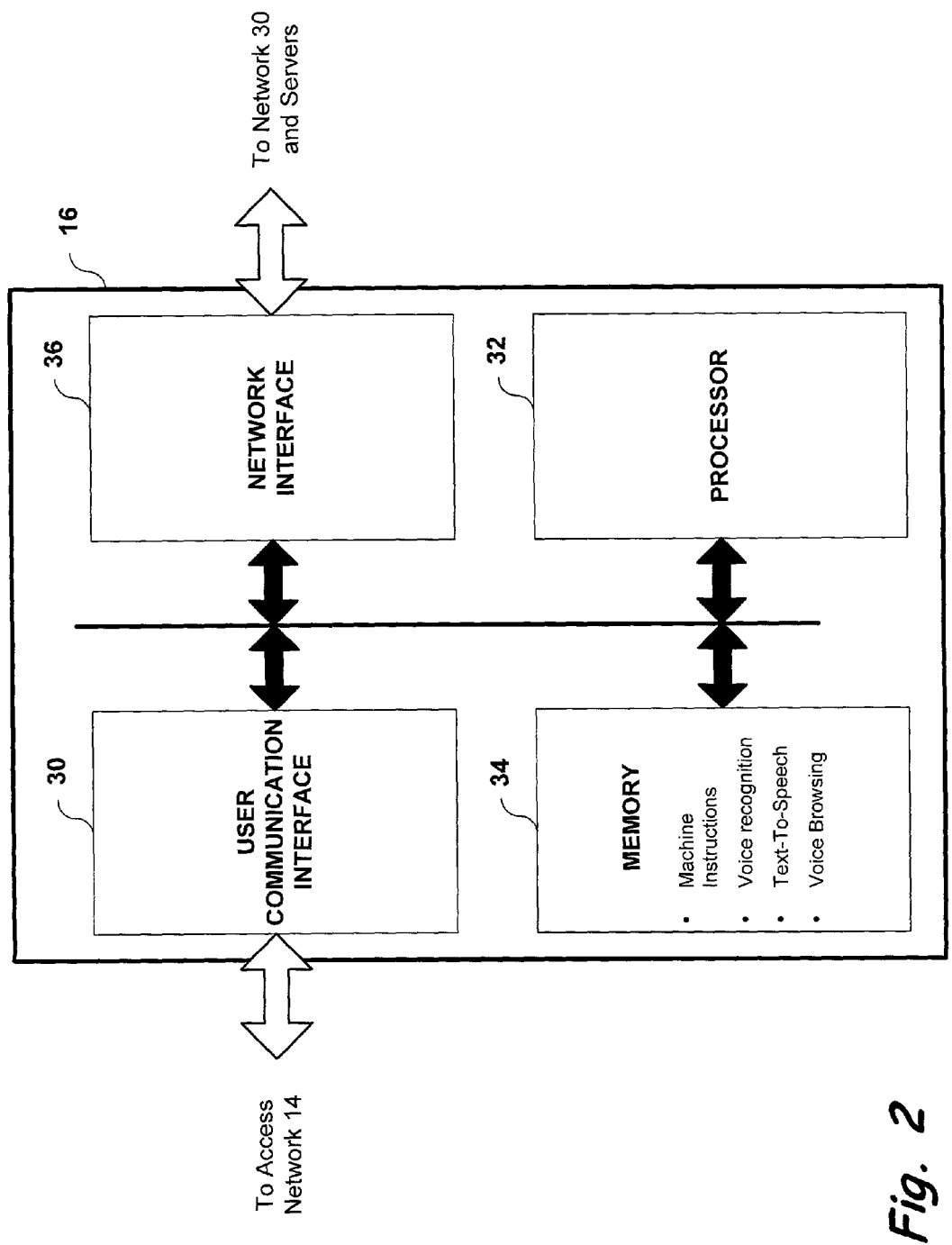
FIG. 2 is a simplified block diagram of a gateway that may be used with the exemplary embodiments.

FIG. 2 depicts a functional block diagram of gateway 16. Gateway 16 may include, as shown, a user communication interface 30, a processor 32, a memory 34, and a network interface 36. The memory may include machine instructions, or alternatively gateway 16 could access machine instructions stored externally; the instructions may be executable by the processor to perform voice recognition, text-to-speech conversion, and voice browsing. Gateway 16 may similarly include or access a set or sets of machine instructions to carry out the various other functions described here. The memory may be ROM, RAM, magnetic, or optical, for example.

It will be noted that the functions carried out by gateway 16 could be performed by a single entity or multiple entities in combinations and configurations other than that shown. Thus, gateway 16 may represent logical functions rather than a physical device without departing from the spirit and scope of the present invention.

Figure 3:
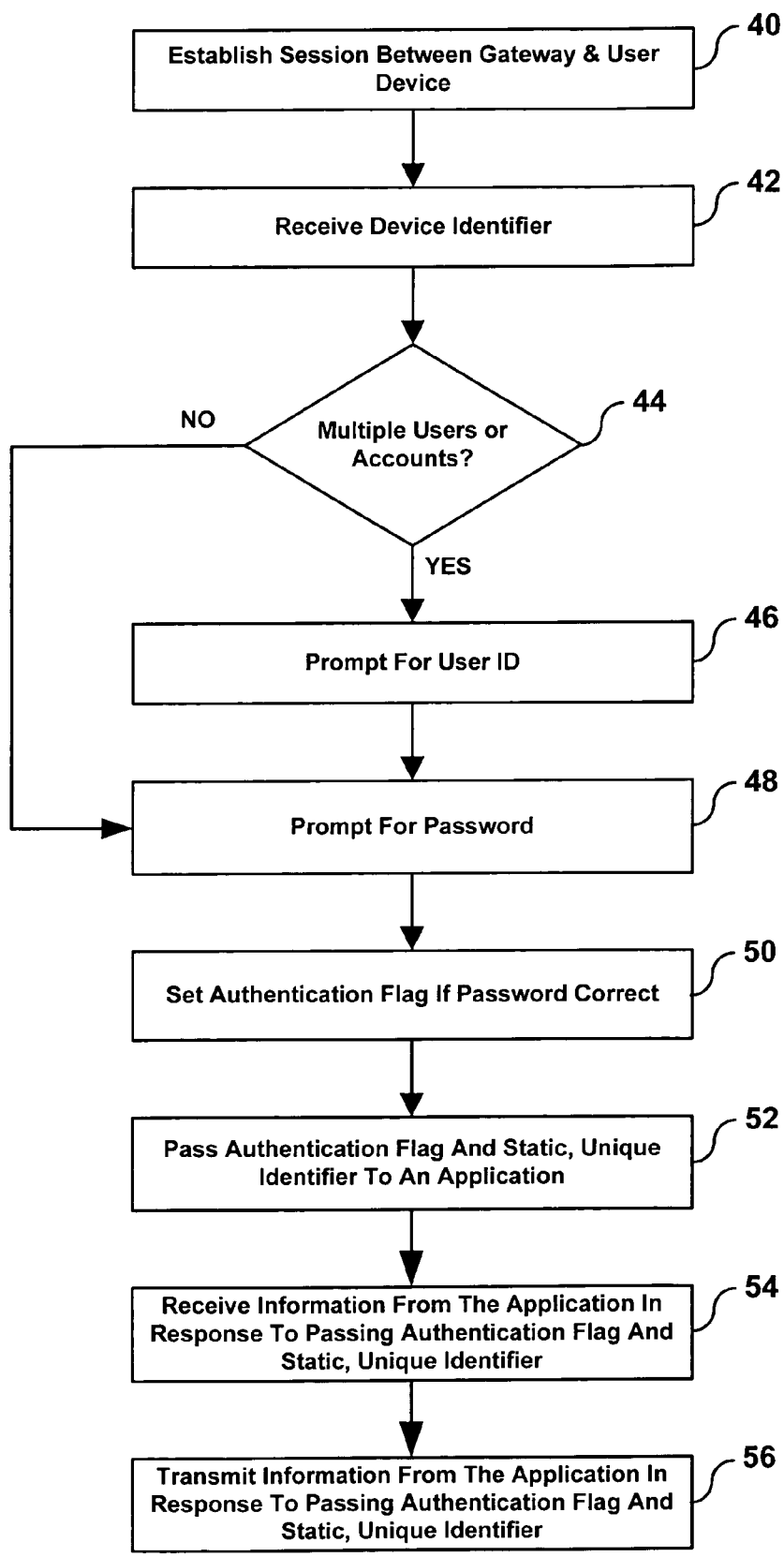
FIG. 3 is a flow chart of functions that may be carried out in accordance with the exemplary embodiments.

FIG. 3 is a flow chart of functions that may be carried out in accordance with the exemplary embodiment. At block 40, a session can be initiated between user device 12 and gateway 16 in response to a user's request. For example, a user might initiate a session by establishing communications with gateway 16 by pressing "* TALK" on a mobile station, although other alternatives are possible. Initiating a session is not necessarily critical to all embodiments of the present invention. For example, a user could initially establish a communication session with gateway 16 that does not require authentication, such as browsing static web pages via voice browser. The user could then take an action that would require authentication, such as requesting an account balance from a financial institution's application or making an on-line purchase using a credit card, at which point the authentication process could be carried out.

As shown at block 42, gateway 16 can receive, from user device 12, a unique device identifier such as a mobile identification number, a mobile device number, a mobile subscriber ID, electronic serial number, or any other identifier associated with user device 12. A service provider, such as a wireless telephone company, can maintain records that relate to such device identifiers and the owners and/or users of user devices. Because a device identifier is associated with one user device about which a service provider has records, gateway 16 (which may be owned or operated by, or accessible to, the service provider) can determine whether multiple accounts or users are associated with the user device, as shown at block 44. Further, by requiring a device identifier coupled with other security measures, it is very unlikely that an unauthorized user could "hack" into the system. This additional security measure can help assure third-party service providers that an authentication performed by a system in accordance with the exemplary embodiment can be trusted.

If more than one account or user is associated with user device 12, gateway 16 can prompt the user for a user ID or account number or other identification, per block 46. Because gateway 16 can access records associated with user device 12, this procedure can be simplified. For example, rather than requiring a user to enter a lengthy account number, gateway 16 could prompt the user to enter an ID or account identifier by transmitting a request (audible or screen-based) such as "please press or say '1' for John Doe; please press or say '2' for Jane Doe," etc. If gateway 16 is a voice command platform, this technique can speed up user identification and authentication because recognition of only a single digit spoken by a human, rather than a longer account number (such as a sequence of digits) is all that is required.

Similarly, gateway 16 could pass a user's device ID to a voice-activated dialing (VAD) application. The VAD application could then use that device ID as a key to access a personal address book associated with the user. The VAD application could then receive a name spoken by the user and, by reference to the address book, convert the name to an associated telephone number and set up a call to that telephone number.

As shown at block 48, if gateway 16 determines that there is only one user or account associated with user device 12, there is no need to prompt for a user ID, and gateway 16 can immediately prompt the user for a gateway password, rather than first prompting for a user ID. A gateway password can be a password that is previously stored, and that is associated with one user or device. Any number of techniques can be used to ensure that a password that is first stored is associated with a user. For example, the user could be prompted to enter, from a user device, personal information such as social security numbers, addresses, mother's maiden name, etc., that the service provider has stored and which is associated with the user's account. Alternatively, a password could be entered by the service provider's employee while the user is present and can be identified by reliable means, such as a photo ID.

Once a gateway password associated with a particular device and/or user or account is recognized as valid (i.e., the gateway password matches a previously stored password), gateway 16 can set an authentication flag (as shown at block 50) that indicates the user has been identified and authenticated. Because of the close control a wireless service provider can exercise over its subscriber's accounts, devices, and the provider's resources, and because it can be verified that a password is associated with a particular device, third parties may be willing to trust an authentication made as described above. The user ID, the gateway password, or both may be human speech signals that can be recognized by a voice-command platform, or they could be DTMF signals or other electronic signals.

Additionally, by tracking the resources a user accesses and associating them with the user, the user's ID, the device, and/or the user's gateway password, gateway 16 may provide responses, prompts, or shortcuts, etc., tailored to what the user has done in the past. As noted above, the user profile can include a record of session information, which in turn may include user navigation history.

More specifically, the navigation history can include a list of navigation points (e.g., uniform resource identifiers (URIs), menu items, URLs, fragment identifiers, etc.) that identify the specific session state or resource the user has accessed. An example of a resource that might be represented by a navigation point is a unique web page, such as an HTML document. Using navigation history, gateway 16 may access a user's profile to relate a term, such as "balance," for example, to a user's previous navigation to a resource that requested the user to say "balance" in order to access the user's balance in a third-party provider's database. Gateway 16 may thus transmit to the third-party provider's application an HTTP request, as one example, for the user's account balance whenever the user speaks the word "balance," or otherwise enters the word balance, or selects a navigation point that corresponds to the resource associated with the user's account balance. The third-party application could respond to the request just as it would to any other HTTP request, returning, for example, either wireless mark-up language (WML) or HTML content to the gateway, which could then transmit the content to the user device.

Once an authentication flag is set, gateway 16 can pass or transmit to an application, such as application 20, 24, or 28, an authentication indicator and a static, unique identifier, as shown at block 52. The static, unique identifier may be a hash or encrypted identifying information associated with a user, while the authentication indicator can be a single bit in a predefined field. Other authentication indications are possible as well. The static, unique identifier and the authentication indicator may be passed to an application in an HTTP header, although other alternatives are possible as well. As discussed above, if the entity providing the authentication indicator is trusted, the application's provider can provide, to gateway 16, secure information that is normally only available after a user is authenticated directly by the application or third-party service provider, as when a user enters an application-specific password and/or user ID.

Gateway 16 can receive the protected information in response to passing the static, unique identifier and authentication indicator to an application, as shown at block 54, and then gateway 16 can transmit the protected information to user device 12 as shown at block 56. An authentication flag can be set when a user device and a user is successfully identified by gateway 16. The authentication flag will be cleared when the user ends the communication session, since the user's identity can no longer be assured once a session has ended and a new session is started. In other words, a user must re-enter a password after a session ends (e.g., a call is terminated) and another session is begun. Because an authentication flag is set when a user is authenticated, and remains set throughout a single session, an authentication indicator and a static, unique identifier may be passed to any application the user accesses while in a single session without repeating any authentication or log-on procedure.

When a user first accesses a particular third-party application via gateway 16 (that is, for the first time ever, not just within a session), the application might be programmed to not recognize any information passed from gateway 16 to authenticate the user. Alternatively, a user could interact with an application or its provider in advance to set up the system. If access is not set up in advance, however, the application may require users to log on directly, such as by entering a user ID and password that relates the user to the third-party application, rather than a user ID and password that associates the user with the operator of gateway 16. Such a direct log on may be required even though the user may have already been authenticated by gateway 16 as described above. In such a first-time use, gateway 16 would still pass a static, unique identifier and authentication indicator to the application, so that after the user logs on directly with the application, the third-party application provider can capture the authentication information in the HTTP header that was transmitted to the application from gateway 16. Once the header information is captured and the user logs on, the application can create a relation between the authentication information and its record of the user, so that the user will not need to perform any further log-ons after the first time. For instance, the third-party provider can maintain its own user profile that associates static, unique identifiers with specific users about whom the third-party provider has information.

As a specific example, suppose a user has an account at Joe's Bank, and has accessed account information via the Internet in the past. When the user accesses the application for Joe's Bank through gateway 16 for the first time, after already being authenticated by gateway 16, gateway 16 will pass a static, unique identifier associated only with that user, to Joe's Bank's application server, along with an authentication indicator. Now, the user proceeds to log on to Joe's Bank's website as if he were doing so from a PC—that is, using a user ID and password that is associated with the user's account at Joe's bank, not with gateway 16. Since Joe's Bank's website received the static, unique identifier before the user logged on, Joe's Bank can maintain a record that associates the user's account information with the static, unique identifier. When the user subsequently accesses his account information at Joe's Bank via gateway 16, gateway 16 can again pass the static, unique identifier and an authentication indicator to the Joe's Bank website application, and the application can access the previously stored record and provide account information to the user as if the user logged on to the Joe's Bank website directly.

Use with less secure applications is possible as well. For example, the user device could be a digital camera or other data-only device that is capable of wireless or wireline connection to the Internet. Alternatively, a user device, such as a mobile station, could provide an interface between a digital camera and gateway 16. In accessing applications that may be used for uploading digital pictures, a password and user ID might not be required. Instead, a device identifier alone could be used to provide customized access to applications and services. If the camera, or an associated device, such as a mobile station, is configured to communicate via gateway 16, gateway 16 could receive a device identifier from the digital camera. Gateway 16 could then identify or authenticate the camera as described above and pass an authentication indicator to a picture server to which the user prefers to upload pictures, as indicated by the user's navigation history, and a picture or pictures could be automatically uploaded to the user's specific database.

Provided with the present disclosure, those of ordinary skill in the art can readily prepare computer instructions to carry out the foregoing functions. Those of ordinary skill in the art will further realize that it is not always necessary that the functions described are performed in any particular order, or in any particular software module, or that the functions are even segregated into modules.

Exemplary embodiments of the present invention have been described above. Those skilled in the art will understand, however, that changes and modifications may be made to these embodiments without departing from the true scope and spirit of the invention, which is defined by the claims.

We claim:

1. A gateway comprising:
   a user communication interface;
   a processor; and
   a set of instructions executable by the processor to receive via the communication interface a device identifier, the device identifier being associated with a user device;
   the set of instructions being further executable to identify, directly from the device identifier, an authorized user of the device;
   the set of instructions being further executable to receive via the communication interface a gateway password that is associated with the authorized user;
   the set of instructions being further executable to set an authentication flag in response to the device identifier and the gateway password being received at the gateway;
   the set of instructions being further executable to pass an authentication indicator to at least one application in response to the authentication flag being set, wherein the application comprises an interactive application provided by a third party independent of a provider of wireless communication services;
   the set of instructions being further executable to pass to the at least one application a static unique identifier that is associated with the authorized user.

2. The gateway of claim 1, wherein the set of instructions is further executable to receive a user ID via the communication interface, the user ID being associated with the user;
   the set of instructions being further executable to set the authentication flag in response to receiving the user ID, wherein the authentication flag is not set unless the user ID, the device identifier, and the gateway password are received at the gateway.

3. The gateway of claim 2, further comprising:
   a network interface;
   wherein the authentication indicator and the static unique identifier are passed to the at least one application via the network interface.

4. The gateway of claim 3, wherein the gateway receives, via the network interface, application information from the at least one application that is normally available only after a user enters an application password that is associated with a particular user and with the application, the application information being received in response to the authentication indicator and the static unique identifier being passed to the at least one application.

5. The gateway of claim 1, wherein the authentication indicator is passed to the at least one application in an HTTP header.

6. The gateway of claim 1, wherein the gateway comprises a voice-command platform and the gateway password comprises a human speech signal.

7. The gateway of claim 1, wherein the gateway password comprises one or more DTMF signals.

8. The gateway of claim 1, wherein the application information is received from a plurality of applications during a single communication session.

9. The gateway of claim 8, wherein the application information is transmitted via the user communication interface.

10. A gateway comprising:
    a user communication interface;
    a network interface;
    a processor; and
    a set of instructions executable by the processor to receive, via the communication interface, at least a device identifier associated with a user device;
    the set of instructions being further executable to identify, directly from the device identifier, an authorized user of the device;
    the set of instructions being further executable to receive a gateway password via the communication interface, the gateway password being associated with a user of the device;

the set of instructions being further executable to set an authentication flag in response to the device identifier and the gateway password being received at the gateway;

the set of instructions being further executable to pass an authentication indicator to at least one application when the authentication flag is set, wherein the application comprises an interactive application provided by a third party independent of a provider of wireless communication services;

the set of instructions being further executable to pass to the at least one application a static unique identifier associated with the individual user;

wherein the authentication indicator and the static unique identifier are passed to the at least one application via the network interface, and wherein the gateway receives, via the network interface, application information from the at least one application that is normally available only after a user enters an application password that is associated with a user and with the at least one application, the application information being received in response to the authentication indicator and the static unique identifier being passed to the at least one application;

wherein the application information is transmitted via the communication interface.

11. The gateway of claim 10, wherein the gateway comprises a voice-command platform and the gateway password comprises a human speech signal.

12. The gateway of claim 10, wherein the gateway password comprises one or more DTMF signals.

13. The gateway of claim 10, wherein the application information is received from a plurality of applications during a single communication session.

14. The gateway of claim 10, wherein the set of instructions is further executable to receive a user ID via the communication interface, the user ID being associated with an individual user;

the set of instructions being further executable to set the authentication flag in response to receiving the user ID.

15. The gateway of claim 14, wherein the set of instructions is further executable to transmit a prompt for the gateway password via the communication interface, the prompt being transmitted when a record indicates that there are a plurality of users associated with the user device.

16. The gateway of claim 1, wherein the device identifier is selected from the group consisting of a mobile identification number, a mobile device number, a mobile subscriber identification, and an electronic serial number.

17. The gateway of claim 1, wherein the device identifier comprises a mobile identification number.

18. A method for authenticating a user of a communication device, the method comprising:

receiving at least a device identifier, the device identifier being associated with the communication device;

identifying, directly from the device identifier, an authorized user of the device;

receiving a gateway password, the gateway password being associated with a user of the communication device;

setting an authentication flag in response to receiving the device identifier and the gateway password;

passing an authentication indicator to at least one application in response to the authentication flag being set, wherein the application comprises an interactive application provided by a third party independent of a provider of wireless communication services, the authentication indicator being associated with the gateway password and the communication device; and passing to the at least one application a static unique identifier in response to the authentication flag being set, the static, unique identifier being associated with the gateway password and the communication device.

19. The method of claim 18, further comprising:

receiving secure information from the at least one application in response to passing the authentication indicator and the static, unique identifier to the at least one application.

20. The method of claim 18, wherein the at least one application is a plurality of applications.

21. The method of claim 18, further comprising:

receiving a user ID, the user ID being associated with a user of the communication device;

wherein the authentication flag is not set unless the user ID is received.

22. A method for authenticating a user of a communication device, the method comprising:

receiving a device identifier, the device identifier being associated with the communication device;

identifying, directly from the device identifier, an authorized user of the device;

receiving a gateway password, the gateway password being associated with a user of the communication device;

receiving a user ID, the user ID being associated with the user of the communication device;

setting an authentication flag in response to receiving the device identifier, the user ID, and the gateway password;

passing an authentication indicator to a plurality of applications in response to the authentication flag being set, wherein the applications comprise interactive applications provided by third parties independent of a provider of wireless communication services, the authentication indicator being associated with the gateway password and the communication device; and passing to the at least one application a static unique identifier in response to the authentication flag being set, the static, unique identifier being associated with the gateway password and the communication device; and receiving secure information from the plurality of applications in response to passing the authentication indicator and the static, unique identifier to the plurality of applications.

* * * * *